United States Patent Office 3,255,034
Patented June 7, 1966

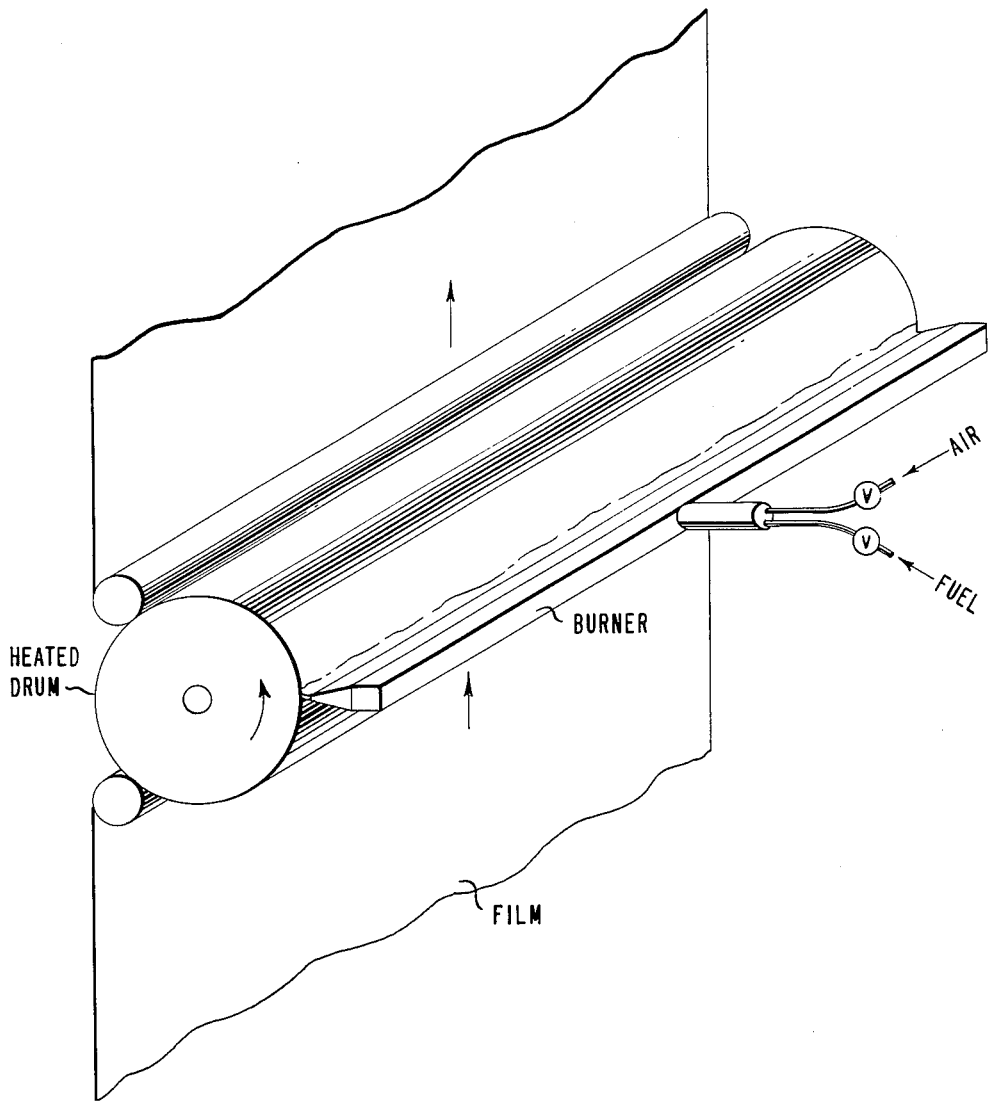

3,255,034
PROCESS FOR PRODUCING A COATED, BIAXIALLY ORIENTED POLYOLEFIN FILM AND THE RESULTING PRODUCT
Edward Royals Covington, Richmond, Va., and Richard Nelson Moyer, Buffalo, N.Y., assignors to E. I. du Pont de Nemours and Company, Wilmington, Del., a corporation of Delaware
Filed Oct. 17, 1962, Ser. No. 231,219
6 Claims. (Cl. 117—47)

This invention is concerned with polyolefin films. More particularly, this invention is concerned with coated biaxially oriented, heat-shrinkable polyolefin films for packaging applications.

It has been known for some time to employ films of branched or so-called low density polyethylene for a large number of packaging applications. While such a film is suitable for many applications, there are many uses for which greater protection than such films provide is needed against permeation of various vapors. Electric discharge treatments have been described for rendering adherable to coatings the surfaces of various films, especially as-cast films which have not been oriented. Other processes have been described for applying firmly bonded coatings to various films (e.g., U.S. Patent 2,824,024—A. F. Chapman; U.S. Patent 2,824,025—W. E. McIntyre; U.S. Patent 2,829,068—J. J. Stewart; and U.S. Patent 2,829,069—R. H. Michel). However, a separate subcoating step is required in these processes. More recently, a process was described (U.S. Patent 2,968,576—T. W. Keller et al.) for giving a polyethylene film a suitable oxidative surface treatment such as by flame treating and thereafter applying by solvent coating a vinylidene chloride copolymer coating.

With the development of biaxially oriented polyolefin films such as biaxially oriented polypropylene and high density polyethylene films as well as biaxially oriented films from blends of high density polyethylene with low density polyethylene, the search for suitabe processes for applying vinylidene chloride copolymer coatings particularly as aqueous dispersions has been intensified. It is found that application of aqueous dispersions of vinylidene chloride copolymer coatings to biaxially oriented polyolefin film given a surface treatment such as above described (for example, U.S. Patent 2,968,576) gives coated films which remain firmly adhered under dry conditions but which fail when exposed to moist conditions. Such conditions would obtain in the wrapping of high moisture containing articles. In the case of oriented, heat-shrinkable films made from high density/low density polyethylene blends and coated with an aqueous vinylidene chloride copolymer dispersion, shrinking by immersion in boiling water has led invariably to loosening of the coatings. The application of subcoats to provide adequate adhesion leads to additional cost and is for the most part commercially impractical.

Accordingly, it is an object of this invention to provide a commercially acceptable process for preparing coated, biaxially oriented, heat-shrinkable polyolefin films. It is a further object to provide a commercially feasible process for producing coated biaxially oriented, heat-shrinkable polyolefin films resistant to removal by the action of water.

The foregoing and related objects are realized by the present invention which, briefly stated, comprises, in combination, the steps of (a) passing a biaxially oriented, heat-shrinkable polyolefin film through a flame emanating from the discharge opening of a burner supplied with a gaseous mixture of a hydrocarbon fuel and oxygen-enriched air, said fuel being selected from the group of hydrocarbons consisting of paraffinic and olefinic hydrocarbons, the fuel equivalence ratio of said gaseous mixture supplied to the burner being between 0.85 and 1.15 the oxygen ratio of said gaseous mixture being between 0.25 and 0.30, the path of the film as it traverses the flame from the burner being located at a distance from the burner less than the length of the unimpeded primary envelope of the flame but not less than the distance below which the velocity of the burning gases escaping from the immediate vicinity of said discharge opening exceeds the burning velocity of the flame, the surface on which said film is supported as said film traverses the flame being maintained at a temperature not above 40° C., the exposure of the film to the action of the flame being for a time between 0.0005 second–0.1 second; (b) applying to said treated surface an aqueous dispersion of a vinylidene chloride copolymer, said copolymer comprising essentially between 80–95 parts by weight of vinylidene chloride between 5–19.5 parts by weight of an alkyl acrylate, said alkyl group having between 1 and 14 carbon atoms, and between 0.5–5 parts by weight of a polymerizable monomer selected from the group consisting of acrylic acid, vinyl pinonate, vinyl carbazole, vinyl triethoxysilane and diethylaminoethylacrylate, and thereafter drying said film to remove water therefrom and to coagulate said copolymer in the form of a continuous adherent coating.

The expression "fuel equivalence ratio," employed herein in defining the gaseous mixture supplied to the burner, is the ratio of the amount of hydrocarbon fuel present in the gaseous mixture supplied to the burner to the amount of hydrocarbon fuel necessary for complete stoichiometric combustion. The term "stoichiometric" characterizes a proportion of substances (or energy) exactly right for a specific chemical reaction with no excess of any reactant or product.

The expression "oxygen ratio" is the ratio of the total amount of oxygen present in the gaseous mixture supplied to the burner to the total amount of non-fuel components in the mixture, said components including chiefly oxygen and nitrogen.

The "primary envelope" of a stable, self-sustaining flame used in carrying out the process of this invention is readily discerned as the luminous, pale blue inner portion of the flame nearer the discharge opening of the burner (roughly conical in shape for a circular discharge opening and wedge-shaped for a rectangular discharge opening) and is readily distinguished from the fainter, less luminous secondary sheath or envelope surrounding it. By "the length of the unimpeded primary envelope" is meant the distance from the discharge opening of the burner to the tip of the primary envelope of the flame when the burner is so positioned that the flame burns freely and the primary envelope is not distorted by impingement on any surface or by the proximate passage of any surface.

An essential feature of the process of this invention is that the gaseous mixture which provides the flame from the burner must be such that the flame is essentially neutral, i.e., is neither oxidizing or reducing in its action. To insure such a flame it is required that the fuel equivalence ratio of the gaseous mixture should be maintained close to 1.00, preferably within the range of from 0.95 to 1.05. However, satisfactory adhesion of the coating subsequently applied to the flame-treated film is obtained with a fuel equivalence ratio as low as 0.85, and as high as 1.15. It is further required that the oxygen ratio of the gaseous mixture be maintained within the range of from 0.25 to 0.30. Little benefit is to be gained from operating higher oxygen ratios, and at ratios much below 0.25 the adhesion values of the coatings rapidly diminish. While the invention is illustrated with propane as the fuel gas for the flame treatment, the process is, of course, operable with other hydrocarbon fuels such as butane, ethane, ethylene, acetylene and the like or with a mixture of such gases.

In order to achieve satisfactory flame treatment the surface of the film undergoing treatment should be spaced from the discharge opening of the burner a distance less than the length of the unimpeded envelope of the flame but such distance should not be less than the distance below which the velocity of the burning gases escaping from the immediate vicinity of said discharge opening exceeds the burning velocity of the flame. In practice, in the treatment of film composed of a blend of high and low density polyethylene, a distance of between 2.9 mm. and 3.1 mm. from the film surface to the discharge opening of the burner has given optimum results. The optimum distance will, of course, vary with variations in the velocity of the burning gases issuing from the burner opening, and hence with the height of the flame as well as with film speed.

The film supporting surface in contact with the surface of the film directly opposite the surface of film undergoing flame treatment should be maintained at a temperature not higher than 40° C., and preferably should be maintained as illustrated in the accompanying drawing wherein the film is shown passing over a drum provided with conventional means (not shown) for maintaining the surface of the drum at a temperature of not above 40° C. A burner, to which is fed fuel and oxygen enriched air as above specified, extends parallel to the longitudinal axis of the drum and provides from a slotted discharge opening a continuous ribbon flame substantially coextensive with the width of the film.

In the second step of the process of this invention, an aqueous dispersion of vinylidene chloride copolymer, said copolymer comprising essentially from 80 to 95% by weight of vinylidene chloride, from 5 to 19.5% of an alkyl acrylate wherein the alkyl group contains from 1 to 14 carbon atoms, and from 0.5 to 5% of a polymerizable monomer selected from the group consisting of acrylic acid, vinyl pinonate, vinyl carbazole, vinyl triethoxysilane, and diethylaminoethylacrylate, is applied to the treated surface of the film by any convenient film coating technique. Thereafter the coated film is dried in conventional fashion whereby to coagulate the particles of the dispersion to form a continuous coating and to remove excess moisture from the coated film.

The important consideration in the vinylidene chloride copolymer coating is that it contain acrylic acid or its equivalent, i.e., vinyl pinonate, vinyl carbazole, vinyl triethoxysilane, or diethylaminoethyl acrylate. There should be at least 0.5 part by weight of acrylic acid or its equivalent in the copolymer and preferably at least about 1.0 part. As much as 5 parts by weight of acrylic acid can be used, but there is little advantage in going above this amount. With respect to the vinylidene chloride component, it is found that amounts in the range of 80 to 95 parts by weight are operable. The copolymer should contain also at least one other polymerizable mono-olefinic monomer such as methyl acrylate and in amounts from 5 to 195 parts by weight with about 8.5 to 10 parts by weight being preferred. While the preferred copolymer composition contains methyl acrylate, other acrylates may be used wherein the alkyl groups range from methyl to tetradecyl groups including, for example, methyl, ethyl, isobutyl, butyl, n-hexyl, 2-ethylbutyl, octyl, 2-ethylhexyl, decyl, dodecyl, tridecyl and tetradecyl acrylates. The corresponding methacrylates can also be employed. Still other polymerizable monomers such as acrylonitrile, methacrylonitrile, methyl vinyl ketones and vinyl esters such as vinyl acetate may be used. The aqueous vinylidene chloride copolymer dispersions may be prepared essentially as described in U.S. Patent 2,570,478.

This invention may be employed to flame treat and coat any biaxially oriented, heat-shrinkable polyolefin film, such as, for example, biaxially oriented, heat-shrinkable polypropylene film and high density polyethylene films as well as biaxially oriented, heat-shrinkable films from blends of high density polyethylene with low density polyethylene.

A preferred film for purposes of this invention is a biaxially oriented, heat-shrinkable polyethylene film comprising a homogeneous blend of (a) from 50 to 90% by weight based on the total weight of the blend of a low density polymer selected from the group consisting of polyethylene and copolymers of ethylene with olefinically unsaturated monomers copolymerizable therewith, said polymer having a density within the range of 0.91 to 0.93 gram/cc. at 25° C., and (b) from 50 to 10% by weight of a high density linear polymer selected from the group consisting of linear polyethylene and linear copolymers of ethylene with olefinically unsaturated monomers copolymerizable therewith to form linear copolymers, said high density linear polymer having a density within the range of 0.94 to 0.98 gram/cc. at 25° C.

The following examples will serve to more fully illustrate the principles and practice of this invention.

EXAMPLE I

A biaxially oriented, heat-shrinkable polyethylene film made from a blend of 75% by weight of "Alathon" 1413 low density (0.915) resin and 25% "Alathon" 7020 high density (0.958) polyethylene resin as described in Example 1 of U.S. application Serial No. 119,309, filed June 26, 1961, by Ralph C. Golike, and now abandoned, was given a flame treatment in the apparatus shown schematically in the accompanying drawing. The burner lip opening was 100 mils in width, the film distance from the burner opening was 3.0 mm., the drum temperature was maintained at 40° C., and propylene was employed as fuel. The rate of flame treating was 200 feet per minute.

The treated film was coated with a 41.6% solids aqueous dispersion of a vinylidene chloride copolymer containing 90.5 parts by weight of vinylidene chloride, 9.5 parts by weight of methyl acrylate and 2 parts by weight of acrylic acid. The coated film was dried and then submitted to adhesion tests; the thickness of the coating on the film was approximately 4 grams per square meter. The coating was very firmly adhered and when tested under dry conditions "could not peel" (CNP) bonds were obtained. The wet adhesion of the coating was tested by dipping the coated film into boiling water for 1 minute which simulates the conditions under which these films would be subjected for shrinking them on various articles. The results are as follows:

| Oxygen Ratio | Fuel Equivalence Ratio | Adhesion— 1 min. boiling water |
|---|---|---|
| 0.265 | 0.85 | CNP |
| 0.265 | 1.00 | CNP |
| 0.265 | 1.15 | 0 |
| 0.278 | 0.85 | 30 g. |
| 0.278 | 1.00 | CNP |
| 0.278 | 1.15 | 0 |

Under the preferred conditions of film treating, there was no indication of loosening of the coating from the base film. A similarly treated film coated with a copolymer in which 2 parts of itaconic acid was used in place of a similar amount of acrylic acid, the coating showed evidence of loosening on immersion in boiling water for one minute. It was observed that at lower oxygen ratios than those shown in the table the wet peel strength of the coating on the base film gradually diminished until at an oxygen ratio of .21 the coating showed essentially no peel strength when immersed in boiling water for 1 minute.

The series of experiments described below illustrate the effect of various process variables on adhesion under wet conditions (immersion in water at 25° C.).

Experiment A.—Effect of film speed

The effect of film speed on adhesion results is shown below.

| Oxygen Ratio | Fuel Equivalence Ratio | Film Speed (f.p.m.) | Wet Adhesion— 4 hours |
|---|---|---|---|
| 0.265 | 1.00 | 500 | 52 g. |
| 0.265 | 1.00 | 400 | CNP |
| 0.265 | 1.00 | 300 | CNP |
| 0.265 | 1.00 | 200 | CNP |
| 0.278 | 1.00 | 500 | 350 g. |
| 0.278 | 1.00 | 400 | CNP |
| 0.278 | 1.00 | 300 | CNP |
| 0.278 | 1.00 | 200 | CNP |

Experiment B.—Effect of burner distance from film

A number of test runs were made in which distance of the film from the opening of the burner was varied with an oxygen ratio of 0.265, a fuel equivalence ratio of 1.00 and over a speed range of 200 to 400 f.p.m. At distances less than 2.9 mm., there was a tendency to burn the film; at distances greater than 3.1 mm. inadequate film treatment was obtained.

EXAMPLE II

Following the flame treating procedure described above wherein the burner distance was set at 3.0 mm., the oxygen enrichment ratio at 0.265, the fuel equivalence ratio set at 1.00, and the film was treated at a speed of 200 feet per minute, the film so treated was coated with various vinylidene chloride copolymer dispersions. The coated films were dried, then immersed in water at 25° C. for 4 hours and the degree of adhesion between the coating and the base sheet was determined. The results of these experimental runs are shown below.

| Polymer | Monomer Ratios | 4 hour Wet Adhesion |
|---|---|---|
| VCl₂/MA/AA | 90.5/9.5/2 | CNP. |
| VCl₂/MA/AA | 91.5/9.5/1 | PP. |
| VCl₂/MA/MAA | 91.5/8.5/2 | 250 g. |
| VCl₂/MA/IA | 91.5/8.5/2 | 250 g. |
| VCl₂/MA/EBA/AA | 92/5/3/2 | CNP. |

LEGEND: EBA=2-ethyl butyl acrylate; VCl₂=vinylidene chloride; MA=methyl acrylate; IA=itaconic acid; MAA=methacrylic acid; AA=acrylic acid; CNP="could not peel"; PP="partially peeled."

It will be observed that the copolymer coatings containing acrylic acid show superior adhesion under the wet conditions. Substitution of acrylic acid in the copolymer by vinyl carbazole, vinyl triethoxysilane or diethylaminoethylacrylate also gave CNP bonds in the four hour wet adhesion test.

In the foregoing examples the bond strength was determined by pressing a one-inch wide strip of Red Cellophane Tape No. 60 (Minnesota Mining and Manufacturing Co.) on the coated surface of a strip of the film of the same width, clamping the non-attached ends of the respective strips and measuring the force required to draw the strips apart.

We claim:

1. A process for producing a coated, biaxially oriented, heat-shrinkable polyolefin film, said coating being strongly adherent to the base sheet under wet conditions, which comprises, in combination, the steps of (a) passing a biaxially oriented, heat-shrinkable polyolefin film through a flame emanating from the discharge opening of a burner supplied with a gaseous mixture of a hydrocarbon fuel and oxygen-enriched air, said fuel being selected from the group of hydrocarbons consisting of paraffinic and olefinic hydrocarbons, the fuel equivalence ratio fraction of said gaseous mixture supplied to the burner being between 0.85 and 1.15, the oxygen ratio of said gaseous mixture being between 0.25 and 0.30, the path of the film as it traverses the flame from the burner being located at a distance from the burner opening less than the length of the unimpeded primary envelope of the flame but not less than the distance below which the velocity of the burning gases escaping from the immediate vicinity of said discharge opening exceeds the burning velocity of the flame, the surface on which said film is supported as said film traverses the flame being heated and maintained at a temperature not above 40° C., the exposure of the film to the action of the flame being for a time between 0.0005 second and 0.1 second; (b) applying to said treated surface an aqueous dispersion of a vinylidene chloride copolymer, said copolymer comprising essentially from 80 to 95% by weight, based on the total weight of the copolymer, of vinylidene chloride, from 5 to 19.5% of an alkyl acrylate, said alkyl group having between 1 and 14 carbon atoms, and from 0.5 to 5% of a polymerizable monomer selected from the group consisting of acrylic acid, vinyl pinonate, vinyl carbazole, vinyl triethoxysilane and diethylaminoethylacrylate, and thereafter drying said film to remove water therefrom and to coagulate said copolymer in the form of a continuous adherent coating.

2. The process of claim 1 wherein said copolymer comprises essentially 80 to 95% by weight, based on the total weight of the copolymer, of vinylidene chloride, from 5 to 19.5% of methyl acrylate, and from 0.5 to 5% of acrylic acid.

3. The process of claim 1 wherein said biaxially oriented, heat-shrinkable polyolefin film is a heat-shrinkable, biaxially oriented polyethylene film consisting essentially of a homogeneous blend of (a) from 50 to 90% by weight based on the total weight of the blend of a low density polymer selected from the group consisting of polyethylene and copolymers of ethylene with olefinically unsaturated monomers copolymerizable therewith, said polymer having a density within the range of 0.91 to 0.93 g./cc. at 25° C., and (b) from 50 to 10% by weight of a high density linear polymer selected from the group consisting of linear polyethylene and linear copolymers of ethylene with olefinically unsaturated monomers copolymerizable therewith to form linear copolymers, said high density linear polymer having a density within the range of 0.94 to 0.98 g./cc. at 25° C.

4. A coated, biaxially oriented, heat-shrinkable polyolefin film produced by the process of claim 1.

5. A coated, biaxially oriented, heat-shrinkable polyolefin film produced by the process of claim 1 wherein said vinylidene chloride copolymer comprises essentially from 80 to 95% by weight, based on the total weight of the copolymer, of vinylidene chloride, from 5 to 19.5% of methyl acrylate, and from 0.5 to 5% of acrylic acid.

6. A coated, biaxially oriented, heat-shrinkable polyolefin film produced by the process of claim 3.

References Cited by the Examiner

UNITED STATES PATENTS

| | | |
|---|---|---|
| 2,632,921 | 3/1953 | Kreidl. |
| 2,648,097 | 8/1953 | Kritchever. |
| 2,795,820 | 6/1957 | Grow et al. _____ 117—138.8 XR |
| 2,968,576 | 1/1961 | Keller et al. _____ 117—138.8 XR |
| 3,031,332 | 4/1962 | Rothacker _____ 117—138.8 XR |
| 3,057,752 | 10/1962 | Covington et al. _ 117—138.8 XR |
| 3,153,683 | 10/1964 | Bryan et al. _____ 117—46 X |
| 3,153,684 | 10/1964 | Bryan et al. _____ 117—46 X |

WILLIAM D. MARTIN, *Primary Examiner.*

RICHARD D. NEVIUS, C. A. HAASE, H. E. COLE, W. D. HERRICK, *Assistant Examiners.*